Sept. 23, 1958  R. L. FINCH ET AL  2,853,313
ANTI-JACKKNIFING MEANS FOR TRAILERS AND TRACTORS
Filed May 17, 1957
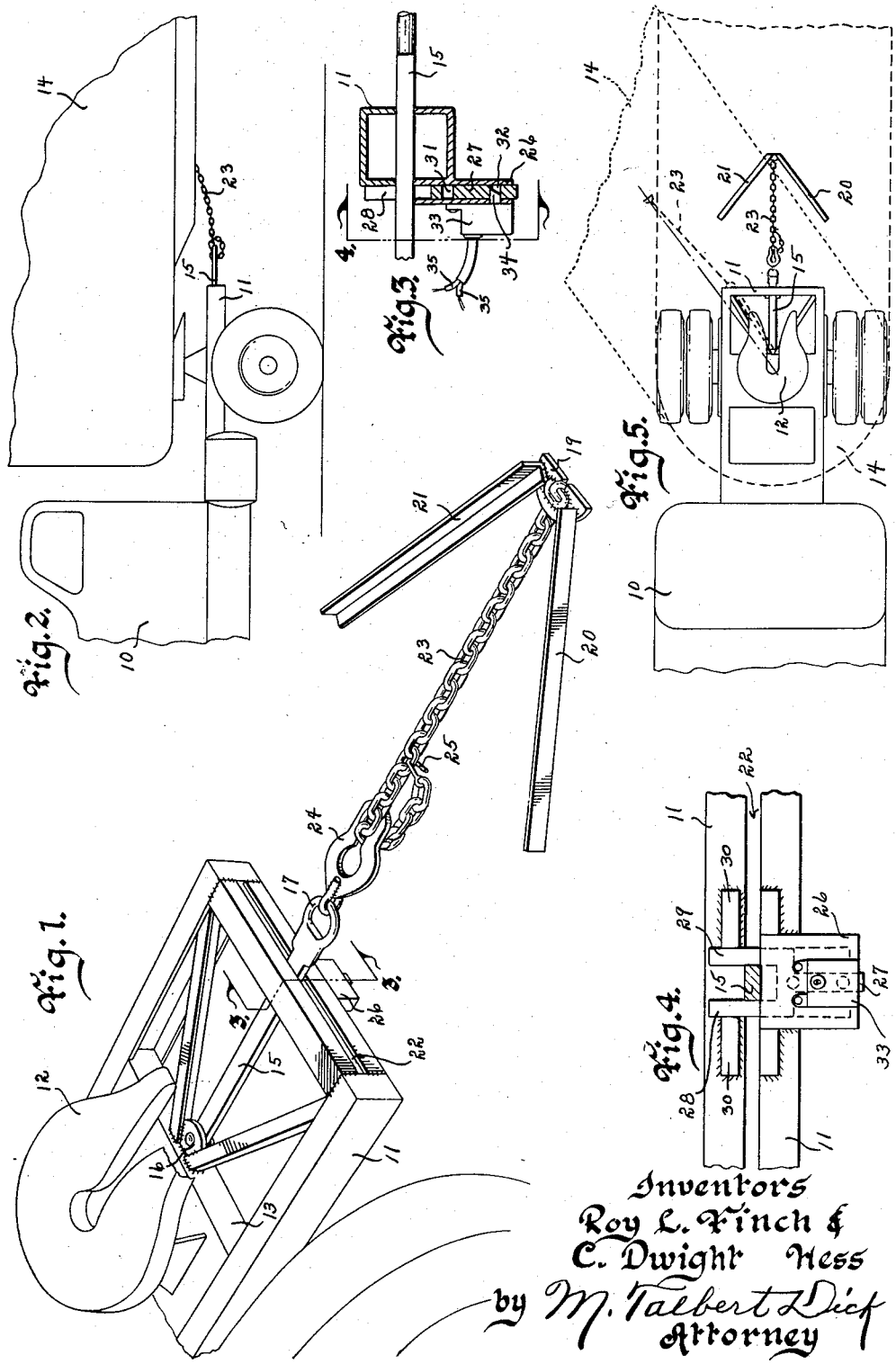
Inventors
Roy L. Finch &
C. Dwight Hess
by M. Talbert Dick
Attorney United States Patent Office 2,853,313
Patented Sept. 23, 1958

2,853,313

ANTI-JACKKNIFING MEANS FOR TRAILERS AND TRACTORS

Roy L. Finch and Clarence Dwight Hess, Des Moines, Iowa

Application May 17, 1957, Serial No. 659,998

4 Claims. (Cl. 280—432)

This invention relates to a safety device for preventing the jackknifing of prime movers relative to the trailers which they are pulling, and is an improvement on the anti-jackknifing device illustrated in the Roy L. Finch Patent No. 2,698,189, issued December 28, 1954, on an Anti-Jackknifing Means for Trailers and Prime Movers.

Today the use of large semi-trailers pulled by self-propelled vehicles, generally called tractors, is becoming increasingly more in number for the transportation of freight. These trailers are usually large and capable of carrying great loads of merchandise. As is well known, they are horizontally pivoted to the rear portion of the tractor by use of means usually referred to as a "fifth wheel." Because of the comparative ease with which the front end of the trailer will pivot on the tractor, an ever present danger exists that the tractor and trailer will jackknife relative to each other when on wet or slippery surfaces and on certain inclines. What usually happens in such accidents is that the tractor will start to skid and due to the weight of the trailer, the skidding moment will be intensified and accelerated. With the vehicle thus out of control, the entire unit will frequently leave the road and turn over in a ditch or else swing into the path of other vehicles.

Many devices have been provided and installed to reduce such hazards. Most of these devices are extremely complicated, heavy and costly, and some are activated manually by the vehicle driver. However, once such a skid has started, the operator of the vehicle is too busy and time is too short for him to manually activate the device once such a doubling up of the trailer and tractor is underway. Additional methods have employed chain means. While such chain means are much less expensive, they must be relatively tight to effectively stop the jackknifing action before it gets underway. However, by so using the chains in tightened condition the normal turning movement of the unit is greatly restricted.

Therefore, the principal object of our invention is to provide a simple anti-jackknifing means that will effectively prevent such catastrophies by having a relatively tight chain when the vehicle is proceeding along the highway, but will permit a considerable looser chain when the vehicle is making abnormal turning movements such as narrow sharp corners, backing up, and like.

A further object of this invention is to provide a safety device of the above type that is economical in manufacture and installation between the tractor and trailer.

A still further object of this invention is to provide an anti-jackknifing device between prime movers and trailers that is durable in use.

These and other objects will be apparent to those skilled in the art.

Our invention consists in the construction, arrangement, and combination of the various parts of the device, whereby the objects contemplated are attained as hereinafter more fully set forth, specifically pointed out in our claims, and illustrated in the accompanying drawings, in which:

Fig. 1 is a perspective view of our invention installed on a tractor,

Fig. 2 is a side view of the invention installed on a tractor and connected to the trailer, Fig. 3 is a cross sectional view of the locking means and is taken on line 3—3 of Fig. 1, Fig. 4 is a front view of the locking means and is taken from the line 4—4 of Fig. 3, and Fig. 5 is a plan view of the device installed and illustrating its operation during a turning moment.

In these drawings we have used the numeral 10 to designate a tractor having the rear rectangular chassis frame 11, the fifth wheel unit 12 and the fifth wheel base 13. The numeral 14 generally designates the trailer having its forward end rotatably supported in the usual manner on the fifth wheel unit. It is to such vehicle structure that we install our device and which we will now describe in detail.

The numeral 15 designates a bar having its forward end pivoted to bearing ears 16 as shown in Fig. 1. These bearing ears 16 are centrally secured to the tractor frame or to the rear of the fifth wheel base. The numeral 17 designates an eye on the rear end of the bar 15. The rear free end portion of the bar 15 extends through a horizontal slot 22 in the rear end of the frame 11. By this construction the rear end of the bar 15 may be swung laterally in either direction. While we show the bearing ears 16 for pivoting the rod 15, any suitable attaching means may be employed as long as the attaching point is to the rear of the vertical pivot plane of the fifth wheel so that the tightening of our anti-skid device will be relatively and progressively accelerated as the angle of turn of the tractor relative to the trailer is increased. Thus, the same holds true when the trailer progresses to a side angle relative to the tractor. The length of the bar 15 is such that its rear portion passes through and extends beyond the back of the tractor chassis frame 11. On the under center of the trailer we mount a base 19 having the two forwardly and outwardly extending attaching angle iron braces 20 and 21. These parts 19, 20 and 21 are rigidly secured to the underside of the trailer. Rigidly secured to the base 19 is a chain length 23. The numeral 24 designates a common chain keeper secured to the eye 17. When connecting the trailer and tractor, the chain 23 is adjustably extended through the keeper 24, and any surplus chain beyond the keeper 24 is doubled back upon the chain length and held by the usual hook 25, as shown in Fig. 1. On the forward center side of the rear brace of the chassis 11, and below the slot 22, is a housing 26, as shown in Fig. 4. Vertically slidably mounted in this housing is a bar 27 having two spaced apart upwardly extending posts 28 and 29 at its top. The numeral 30 designates bearing lugs at each side of the posts 28 and 29 on the chassis frame and above the slot 22. When the parts 27, 28 and 29 are in an elevated position, as shown in Fig. 3 and Fig. 4, the posts 28 and 29 will be at each side respectively of the bar 15, thereby preventing the lateral swinging movement of the bar 15. When the parts 27, 28 and 29 are in a lowered position, the posts 28 and 29 will be below the slot 22, and the bar 15 may freely swing from side to side in the slot 22. The numerals 31 and 32 designate holes in the member 27. The numeral 33 designates an electromagnet having a latch bar 34 capable of sliding into and engaging either of the holes 31 and 32 in the member 27. Obviously, when the member 34 is engaging the hole 32, the member 27 will be in an upward position, and the bar 15 will be held against lateral swinging movement. If the electromagnet is actuated, the latch bar 34 will be drawn forwardly from the hole 32 and the member 27, and its two posts 28 and 29 will drop to a lowered position and free of the bar 15. When the member 27 is in such lowered position and the electromagnet is not electrically actuated, the spring loaded latch 34 will be extending into the hole 31, thereby holding the member 27 and its posts 28 and 29 in a lowered position and out of engagement with the bar 15. The numeral 35 designates the electrical lead wires of the solenoid operated latch means just described and which are adapted to be placed in communication with a source of electrical energy by a suitable switch. Such switch may be located within the seating compartment of the vehicle.

In operation, when the tractor is turned to go around a corner or like, the bar 15 and chain will accordingly slide in one direction relative to the transverse slot 22. However, when this unit part, consisting of the bar and chain, reaches the end of the slot, it will thereafter start to tighten as it can no longer extend in a straight line. This action is shown by broken lines in Fig. 5. This tightening action will prevent further angling of the tractor to the trailer and thus prevent serious jackknifing. The slot 22 is, however, of sufficient length to permit normal turning or backing of the vehicles. There are, however, road conditions where even a tolerance for this normal turning moment is objectionable. Such a case would be where the road is straight, but icy conditions are present. For prevention of possible accident such tolerances are undesirable even when there is no icy condition, but the road travel is normal. Therefore, if the bar 15 can be easily locked or unlocked from movement great advantages are realized, and therefore we have provided the locking means shown in Fig. 3 and Fig. 4. Often when starting the vehicle under icy conditions, it is highly desirable to prevent the swinging movement of the bar 15. When such is the case, the member 27 and its two posts 28 and 29 are manually slid upwardly to a position at each side of the bar 15. The latch 34 will snap into the hole 32 and so hold the member 27 upwardly. Then it may be desirable, after the vehicle is in motion and conditions warrant, to permit the full play of the swinging movement of the bar 15. When such is the case, it is merely necessary to actuate the electromagnet of the solenoid 33 thereby causing the latch 34 to withdraw and thus the dropping of the member 27 and its posts 28 and 29. When this U-member is in such lowered position, and the member 33 is not electrically actuated, the latch 34 will snap into the hole 31 and hold the unit in a lowered position. When the U-holding catch is in such lowered position the rod 15 and chain may slide laterally to the left or right. The two ends of the slot 22, however, limit this sliding movement in two directions and if this slot 22 is of substantial length, as shown in the drawings, considerable lateral movement between the prime mover and trailer would be permitted before the substantial tightening of the anti-jackknifing device will result. This considerable play, however, is often most necessary and desirable when very narrow sharp turns must be made or when the vehicle is maneuvering and backing the trailer to a loading dock or like. When this maximum play is desired and the member 27 and its posts 28 and 29 are in elevated condition, it is merely necessary for the operator to cause the actuation of the eletromagnet and permit the U-holding element to slide downwardly. In most cases, however, on highway driving, the member 27 and its posts 28 and 29 will be in an upward position, as shown in Fig. 4. By this construction the chain 23 may be very tight thereby preventing any jackknifing between the tractor and trailer. However, sufficient tolerance is provided for permitting normal turns along the highway. The operation of the device in such locked condition would be the same as if the chain 23 were rigidly attached to the rear center of the frame 11 of the tractor and to the bottom center forward portion of the trailer. On the other hand, when the U-member unit is in lowered position the connection would be from near the fifth wheel area of the tractor and thence to the trailer. This latter operation would be true until the angle between the tractor and trailer was such that the bar rod 15 would engage one or the other of the ends of the slot 22.

Some changes may be made in the construction and arrangement of our anti-jackknifing means for trailers and tractors without departing from the real spirit and purpose of our invention, and it is our intention to cover by our claims, any modified forms of structure or use of mechanical equivalents which may be reasonably included within their scope.

We claim:

1. In combination, a tractor having a rear chassis frame having an elongated horizontal slot, a trailer pivoted to the rear end area of said tractor and at a point forward of the elongated horizontal slot, and an anti-jackknifing device, comprising, a rod bar having its forward end flexibly connected to said tractor forward of said elongated horizontal slot to the rear of the point of pivot between said tractor and trailer, and passing through said elongated horizontal slot at a point along its length, a chain having its rear end connected to the bottom center of said trailer at a point to the rear of said horizontal slot and its forward end detachably connected to the rear end of said rod bar, a bearing secured to the rear center of said rear chassis frame, a U-member vertically slidable on said bearing member capable of embracing and holding said rod bar stationary in said elongated slot when said rod bar is centered and said U-member is in elevated condition, and a means for holding said U-member in an elevated condition.

2. In combination, a tractor having a rear cross chassis frame having an elongated horizontal slot, a trailer pivoted to the rear end area of said tractor and at a point forward of the elongated horizontal slot, and an anti-jackknifing device, comprising, a rod bar having its forward end flexibly connected to said tractor forward of said elongated horizontal slot to the rear of the point of pivot between said tractor and trailer and passing through said elongated horizontal slot at a point along its length, a chain having its rear end connected to the bottom center of said trailer and its forward end detachably connected to the rear end of said rod bar, a bearing secured to the rear center of said rear chassis frame, a U-member vertically slidable on said bearing member capable of embracing and holding said rod bar stationary in said elongated slot when said rod bar is centered and said U-member is in elevated condition, a means for holding said U-member in an elevated condition, and two spaced apart lugs on said member that has said horizontal elongated slot; said lugs resting at each side of said U-member when said U-member is in elevated position.

3. In combination, a tractor having a rear chassis frame having an elongated horizontal slot, a trailer pivoted to the rear end area of said tractor and at a point forward of the elongated horizontal slot, and an anti-jackknifing device, comprising, an elongated flexible unit having one end secured to said tractor at a point forward of said horizontal slot and to the rear of the pivot point of said tractor and trailer, and its other end secured to said trailer at a point to the rear of said horizontal slot, at a point along its length said flexible unit extending through said elongated horizontal slot, a locking means for selectively holding said flexible unit stationary in the central area of said elongated horizontal slot; said elongated flexible unit comprising a rigid rod bar portion in its forward end portion, and a flexible chain portion in its rear end portion.

4. In combination, a tractor having a rear chassis frame having an elongated horizontal slot, a trailer pivoted to the rear end area of said tractor and at a point forward of the elongated horizontal slot, and an anti-jackknifing device, comprising, an elongated flexible unit having one end secured to said tractor at a point forward of said horizontal slot and to the rear of the pivot point of said tractor and trailer, and its other end secured to said trailer at a point to the rear of said horizontal slot, at a point along its length said flexible unit extending through said elongated horizontal slot, a locking means for selectively holding said flexible unit stationary in the central area of said elongated horizontal slot.

References Cited in the file of this patent

UNITED STATES PATENTS 2,698,189  Finch _____ Dec. 28, 1954